United States Patent [19]

White

[11] Patent Number: 4,495,333

[45] Date of Patent: Jan. 22, 1985

[54] POLYPHENYLENE OXIDE/POLYSTYRENE BLOCK COPOLYMERS

[75] Inventor: Dwain M. White, Schenectady, N.Y.

[73] Assignee: General Electric Company, Schenectady, N.Y.

[21] Appl. No.: 555,795

[22] Filed: Nov. 28, 1983

Related U.S. Application Data

[63] Continuation of Ser. No. 390,094, Jun. 21, 1982, abandoned.

[51] Int. Cl.³ .................. C08L 81/02; C08L 85/02
[52] U.S. Cl. ......................... 525/150; 525/92; 525/93; 525/905
[58] Field of Search ............... 525/150, 92, 93, 905

[56] References Cited

U.S. PATENT DOCUMENTS

| | | | |
|---|---|---|---|
| 4,154,771 | 5/1979 | Loucks et al. | 260/823 |
| 4,156,699 | 5/1979 | White | 260/823 |
| 4,221,881 | 9/1980 | White | 525/109 |
| 4,226,951 | 10/1980 | White | 525/92 |
| 4,238,381 | 12/1980 | Komai et al. | 260/31.2 R |
| 4,238,581 | 12/1980 | White | 525/395 |
| 4,238,584 | 12/1980 | White | 525/534 |

*Primary Examiner*—Jacob Ziegler
*Attorney, Agent, or Firm*—Richard J. Traverso; James C. Davis, Jr.; James Magee, Jr.

[57] ABSTRACT

Linear, branched and/or cross-linked block copolymers of poylphenylene oxide and polystyrene obtained using phosphoryl coupling agents is disclosed.

15 Claims, No Drawings

POLYPHENYLENE OXIDE/POLYSTYRENE BLOCK COPOLYMERS

This application is a continuation, of application Ser. No. 390,094, filed June 21, 1982, abandoned.

BACKGROUND OF THE INVENTION

1. Field of the Invention

This invention relates to linear, branched, and/or cross-linked block copolymers of polyphenylene oxides and polystyrenes. The polyphenylene oxide/polystyrene block copolymers can be molded, calendered or extruded as films, sheets, fibers, laminates or other useful articles of manufacture.

2. Description of the Prior Art

Self-condensation reactions of certain phenols employing oxygen in combination with an effective oxidative coupling catalyst system to form monofunctional prior art polyphenylene oxides, i.e., polyphenylene oxides having an average hydroxyl group per molecule of 1.0 or less are well known and are described in various publications including U.S. Pat. Nos. 3,306,875; 3,914,266; 4,028,341 to Hay, U.S. Pat. Nos. 3,956,442; 3,965,069; 3,972,851 and 4,052,553 to Olander.

U.S. Pat. No. 4,154,771 Loucks et al discloses a process of forming phosphorus containing block polymers of polyphenylene oxide.

U.S. Pat. No. 4,156,699 White discloses phosphorus containing block polymers of polyphenylene oxide formed using a phosphoryl halide.

U.S. Pat. No. 4,221,881 White discloses block copolymers of polyphenylene oxide and polystyrene formed using polyacyl halides as coupling agents.

U.S. Pat. No. 4,238,584 White discloses block copolymers of polyphenylene oxide and polystyrene formed using bis(haloformates) as coupling agents.

The polymeric product of the present invention differs from those in the above patents in what is sufficiently branched so as to form a gel which is composed of two different polymeric precursors.

The present process uses a liquid coupling agent as opposed to a solid coupling agent as disclosed in U.S. Pat. Nos. 4,238,381, 4,226,951 and 4,221,881. With a solid coupling agent, the rate of dissolution of the coupling agent substantially controls the rate of addition of reactant which means the solid can be added at once and in excess and still give quantitative coupling. With a liquid or a solution of coupling reagent, the reagent must be added at a carefully controlled rate to prevent an excess of reagent building up before all phenolic end groups have reacted.

SUMMARY OF THE INVENTION

Phosphoryl coupling agents such as phosphoryl chloride randomly couple mixtures of polyphenylene oxides and polyfunctional polystyrenes to yield block copolymers.

According to the present invention there is disclosed a phosphoryl coupled block copolymer comprising a phosphoryl radical, a polyphenylene oxide radical and a polyfunctional polystyrene radical.

According to the present invention there is also disclosed a process of forming a phosphoryl coupled block copolymer comprising contacting a phosphoryl coupling agent a polyphenylene oxide and a polyfunctional polystyrene.

DESCRIPTION OF PREFERRED EMBODIMENTS

Illustrative of the broad group of linear, branched and cross-linked polyphenylene oxide/polystyrene block copolymers included within the scope of the present invention are those described by the following model structures:

(I linear)      AZC, BZC, AZCZ, AZCZB, BZCZB
                AZCZBZCZA, AZCZBZCZCZB, etc.

(I branched)        B    C C    B C    A    C
                AZC, AZBZA, AZBZA, AZCZBZBZA,
                                              A
                etc., etc., etc.

(I cross-linked)         C          Z
                AZBZCZA, CZBZCZ, etc.
                   C  B  C
                AZBZCZBZC  AZBZCZA
                                  A In the above, polyfunctional polyphenylene oxide, monofunctional polyphenylene oxide, polyfunctional polystyrene units and coupling agents are represented by A, B, C and Z, respectively.

As can be seen from the above presentation, various combinations of units as indicated can be formed including random and/or alternating arrangements of polymer units and coupling agents as defined, all of which are described hereinafter in greater detail and the above tabular presentation is not intended to limit the combinations that can be obtained by the practice of the present invention since the block polymer combinations of this invention are limited only by the amount of block polymer precursors charged to the reaction medium in carrying the process of the present invention.

Presently preferred block copolymers of polyphenylene oxide and polystyrene are linear and branched blocked copolymers.

Even more preferred are linear and branched block copolymers containing substantial amounts of polystyrene units, i.e., amounts sufficient to provide polystyrene segments which comprise from about 20 to about 80% by weight of the total weight of the block copolymer in combination with from about 20 to about 80% by weight polyphenylene oxide(s) with about 0.01 to about 10% by weight of phosphorus oxychloride.

As indicated, the term polyphenylene oxide as used herein includes both monofunctional and polyfunctional polyphenylene oxides.

Monofunctional polyphenylene oxides include polyphenylene oxides having an average hydroxyl group per molecule value greater than 0 including 1.0 or less. These polyphenylene oxides are prepared by methods conventional in the art earlier described and can be represented by formula (II):

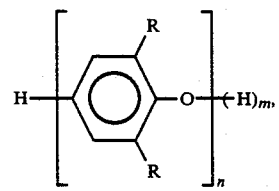

wherein independently each R is hydrogen, hydrocarbon radical, a halohydrocarbon radical, hydrocarbonoxy radical or a halohydrocarbonoxy radical, n is a number of at least 1, preferably 10, and more preferably 40 to 170, and m being a number average of from 0.001 to about 1.0.

Monofunctional polyphenylene oxide units of the block copolymers of the present invention are represented by the above formula (II) when the hydrogen atom is dissociated from the monohydroxy group of the polyphenylene oxide, e.g., when m is 0. When m is 0, the radical of formula (II) can be considered a phenoxy radical, a monovalent phenoxy radical and is abbreviated by —A in the earlier presented tabulation.

Polyfunctional polyphenylene oxides as used herein include quinone-coupled polyphenylene oxides having an average hydroxyl group per molecule greater than 0 including 2.0 or less. These polyphenylene oxides can be prepared by methods as disclosed in U.S. Pat. No. 4,234,706 and U.S. Pat. No. 4,165,422. They can be represented by formula (III) below:

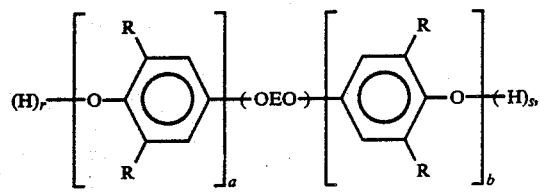

wherein independently each (—OEO—) is a divalent quinone residue, E is a divalent arene radical, either a or b is at least equal to 1, the sum of a plus b is preferably at least equal to 10, more preferably 40 to 170, the sum of r and s being a number average of from about 0.0001 to about 2.0, R is the same as in formula (II) above.

Polyfunctional polyphenylene oxide units in a block copolymer per the present invention are represented by formula (III) above when the hydrogen atoms are dissociated from the polyhydroxy group of the quinone-coupled polyphenylene oxide, e.g., where r and s are 0. When r and s are 0, the radical of formula (III) is a quinone-coupled polyphenoxy radical, a divalent phenoxy radical, and can be abbreviated by the formula —B— in the earlier presented tabulation.

The term polyfunctional polystyrene as used herein includes polystyrene having an average hydroxyl or siloxy group per molecule value greater than 0 including 2 or more.

Such polyfunctional polystyrenes can be prepared by the methods disclosed in U.S. Pat. No. 4,146,697 and U.S. Pat. No. 4,156,764.

The polyfunctional polystyrenes used in the present invention can be represented by formula (IV):

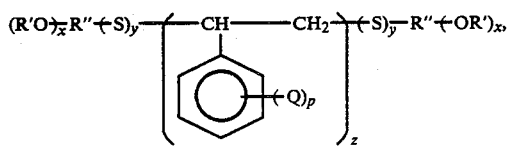

wherein independently each x is an integer at least equal to 1 and is a maximum equal to the number of replaceable hydrogen atoms associated with the R" arene radical, y is an integer at least equal to 1, R' is hydrogen or an organosilyl group, i.e., (R'''₃ Si), R''' being an alkyl, cycloalkyl, or aryl radical including combinations thereof, R" is at least a divalent arene radical having at least one (R'O) radical directly bonded to an aromatic ring carbon atom via an oxygen atom, Q is a hydrogen, halogen, alkyl or alkenyl radical, p is an integer of from 1 to 5, and z is an integer at least equal to 2, preferably 10 to 500, and more preferably 50 to 300.

In a block copolymer per the present invention, the polyfunctional polystyrene units are represented by formula (IV) when the hydrogen or silyl group is dissociated from the oxgyen atom. When the R' group is dissociated, radicals of formula (IV) can be viewed as polystyrene having polyfunctional phenoxy radical end groups and are abbreviated by —C— in the earlier presented tabulation.

Although in formula (IV) the recurring styrenic monomeric units are illustratively described as:

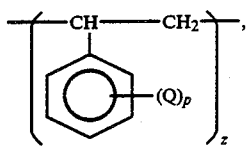

wherein Q, p and z are as defined, the term "polystyrene" as used herein includes any of the well known homo- or copolystyrene types, e.g., styrene-acylonitrile; sytrene-butadiene-acrylonitrile; styrene-butadiene; styrene-divinyl benzene; styrene-maleic anhydride; styrene-methyl methacrylate; styrene-vinyl acetate; styrene-isoprene, etc.

Coupling agents which can be used in the process of the present invention include phosphoryl halides of the general formula ≡P=O including

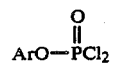

wherein Ar is φ, Tolyl, chlorophenyl, etc., and

wherein R is alkyl, aralykyl, etc.

The preferred coupling agent used in the present invention is phosphorus oxychloride or phosphoryl chloride.

A major advantage of phosphorus oxychloride over other reagents is the low cost of the reagent.

The process of the present invention generally comprises contacting the mono and/or polyfunctional polyphenylene oxides, polyfunctional polystyrene(s) and coupling agents in the presence of an aqueous solution of a water soluble base and a catalytic phase transfer agent.

Any amount of functional (reactive polyphenylene oxide(s), polystyrene(s) and coupling agent can be employed, e.g., from 1/1,000 to 1,000 times the stoichiometric requirements needed to completely couple all of the reactive polyphenylene oxide(s) and polystyrene(s).

While any water soluble base can be employed, preferably the base is an aqueous solution of a water soluble base, e.g., an aqueous alkali metal or alkaline earth metal hydroxide or carbonate solution. Examples include aqueous solutions of potassium hydroxide, sodium hydroxide, sodium monocarbonate, barium carbonate, etc.

The amount of water soluble base is not especially limited, but generally effective molar proportions of water soluble base relative to the amount of coupling agent are coupling agent:water soluble base proportions of from about 1:100 to about 50:1, more preferably from about 2:10 to about 10:1.

In a similar fashion, while any catalytic phase transfer agent can be used, preferably the phase transfer agent is selected from quaternary ammonium, quaternary phosphonium and tertiary sulfonium compounds or mixtures thereof represented by the formulae:

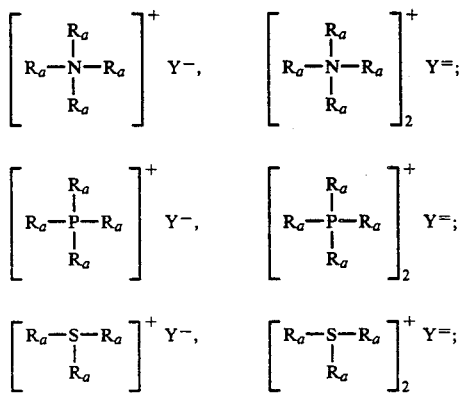

wherein each $R_a$ is independently selected from aliphatic hydrocarbon radicals having from about 1 to about 30 carbon atoms, preferably from about 2 to about 15 carbon atoms, each $Y-$ is selected from the group consisting of $Cl-$, $Br-$, $F-$, $CH_3CO_2-$, $CF_3CO_2-$ or $OH-$, and each $Y=$ is selected from the group consisting of $SO_4=$, $CO_3=$, or $C_2O_4=$.

The amount of catalytic phase transfer agent is not especially limited, but preferred molar proportions of phase transfer agent based on the amount of water soluble base are within the range of from about 1:10 to about 1:1,000, more preferably within the range of from 1:100 to 1:1,000.

The pressure of the process of the present invention is not particularly limited. Convenient processing is carried out at from about 5 psig to about 50 psig, more preferably from 10 psig to 20 psig.

The temperature of the process of the present invention is not limited. Preferably temperatures within the range of from 0° C. to 150° C. or even higher may be used, more preferably from 50° C. to 100° C. to accelerate the process.

Similarly, the time of the process of the present invention is not particularly limited except that the addition of phosphorous oxychloride must be sufficiently slow to prevent capping all of the end groups. Usually processing is completed within about 0.2 to about 5 min, more preferably from 0.5 to 2 min.

The pressure of processing does not substantially effect the time of processing; however, generally the use of higher temperatures lowers the time required while the use of lower temperatures increases the time required.

It is most preferred that the polyphenylene oxides, be they monofunctional or polyfunctional polyphenylene oxides have a relatively low molecular weight, for example, an intrinsic viscosity of from about 0.05 dl/g to about 0.5 dl/g, more preferably from 0.15 dl/g to 0.35 dl/g.

In a similar fashion, it is also preferred that the polyfunctional polystyrene(s) used per the present invention have a relatively low molecular weight, for example, have an intrinsic viscosity of from about 0.05 dl/g to about 0.5 dl/g, more preferably 0.15 dl/g to 0.35 dl/g.

Thus, using a polyphenylene oxide having an intrinsic viscosity of 0.25 dl/g and a polyfunctional polystyrene having an intrinsic viscosity of 0.20 dl/g, one can form a copolymer with an intrinsic viscosity of 0.42 dl/g, which corresponds to an approximate 2.5 fold increase in average molecular weight.

While not to be construed as limitative, it is most preferred that the soluble block copolymers formed per the present invention exhibit a weight average molecular weight of from about 10,000 to about 100,000, more preferably from 20,000 to 50,000.

As opposed to the prior art where polyphenylene oxide and polystyrene have been blended to form homogeneous, compatible blends which benefit from the higher heat distortion temperature of the polyphenylene oxide and the improved processability of of the polystyrene, where both the polyphenylene oxide and polystyrene must have moderately high molecular weights to obtain good blend properties, per the present invention relatively low molecular weight components can be used to form block copolymers with a molecular weight sufficient to provide the desired product properties. The block structure of the copolymer formed per the present invention is established by the formation of a methylene chloride complex which contains both polyphenylene oxide and polystyrene moieties.

In general, the order of addition of various reactants in the process of the present invention is not overly important. However, the phosphorous oxychloride is always added last. Usually, a catalytic amount of phase transfer agent and an excess (based on hydroxyl groups) of a solution of a water soluble base such as sodium hydroxide is added to a mixture of the polyphenylene oxide(s) and polystyrene(s) and, while vigorously stirring at the desired temperature, the phosphorous oxychloride coupling agent is dropwise added, an immediate increase in viscosity being encountered. The reaction then being conducted for the desired amount of time whereafter the resultant block copolymer is separated in a conventional fashion.

For example, with a 50 weight percent polyphenylene oxide (intrinsic viscosity 0.25 dl/g) and a 50% polystyrene (intrinsic viscosity 0.20 dl/g) system, the addition of phosphorus oxychloride to a system as above described provides a copolymer with a network structure. Extraction with hot chloroform dissolves approximately 28% of the copolymer. The soluble fraction was composed of approximately one-third polyphenylene oxide moieties and two-thirds polystyrene moieties. Calculations indicate that the gel fraction contained 57% polyphenylene oxide moieties. The formation of a gel and the retention of polyphenylene oxide moieties in the gel establishes the cross-coupling nature of the coupling reaction. It is believed that phosphorus oxychloride is trifunctional and the polystyrene(s) is bifunctional, a network with branching at the phosphates and chain stopping by the polyphenylene oxide units of the following types is formed:

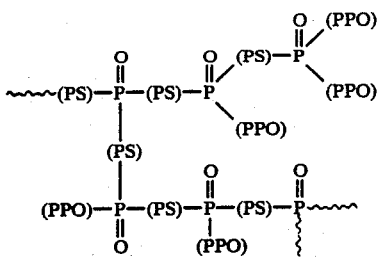

In order that those skilled in the art may better understand my invention, the following examples are given which illustrate currently preferred best modes of practicing my invention.

EXAMPLE I

Poly(2,6-dimethyl-1,4-phenylene oxide) was formed following the procedure of Example I of U.S. Pat. No. 4,238,584. The polyphenylene oxide had an intrinsic viscosity [$\eta$] of 0.25 dl/g.

$\alpha,\omega$(hydroxy/trimethylsiloxy)telechelic polystyrene was formed following the procedure of Example III of U.S. Pat. No. 4,238,584. The polystyrene had an intrinsic viscosity [$\eta$] of 0.2 dl/g.

The telechelic polystyrene was a mixture of the following structures:

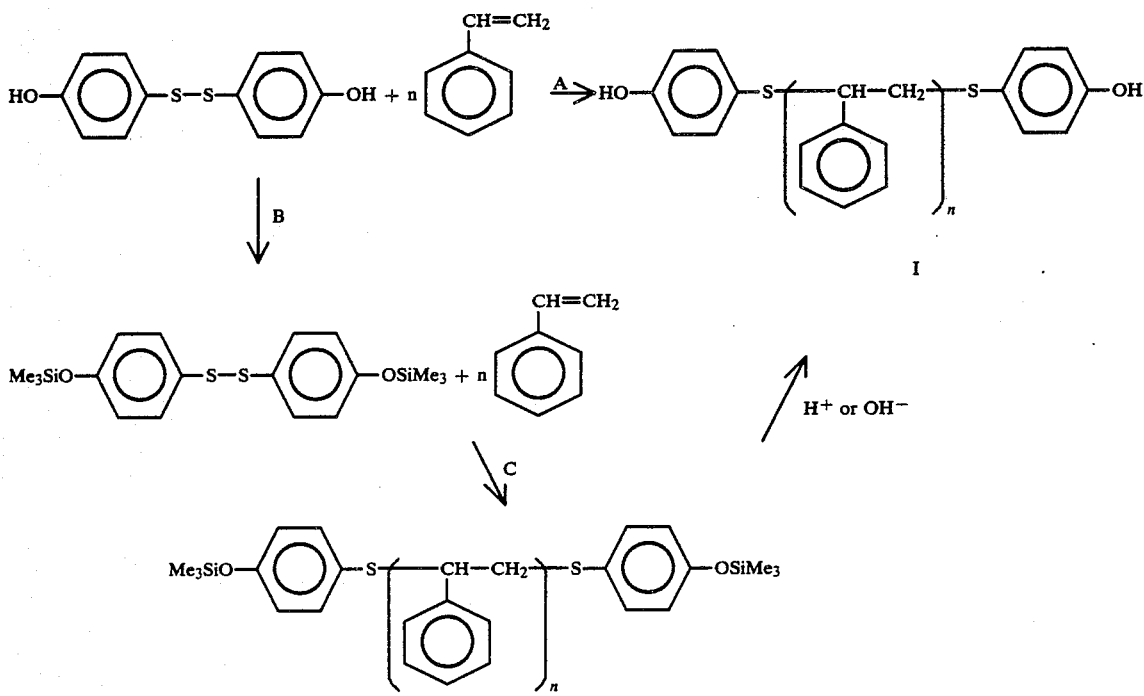

wherein n was from about 1 to 1000.

All other materials are conventional in the art.

2.0 g of the indicated polyphenylene oxide and 2.0 g of the indicated telechelic polystyrene were dissolved in 10 ml of benzene at 50° C. and the system then cooled to 25° C.

While stirring with a Vibromixer, a 50% aqueous sodium hydroxide solution (140 mg, 7 drops) and a 10% aqueous solution of Aliquat 336 solution in benzene (0.20 ml) was added. Aliquat 336 is a conventional phase transfer agent which is methyl tricapryl ammonium chloride.

One minute later a solution of 0.10 g of phosphorus oxychloride in 0.5 ml of toluene was added. One drop was added every two seconds. When approximately one-third of the phosphorus oxychloride had been added, gelation took place. The addition of the remainder of the phosphorus oxychloride did not visibly affect the gel. Yield was 3.8 g.

28% of the gel was soluble in hot chloroform after continuous extraction. The soluble fraction consisted of 32% polyphenylene oxide moieties and 68% polystyrene moieties by pmr analysis. The insoluble portion, by difference, was estimated to be composed of 57% polyphenylene oxide moieties and 43% polystyrene moieties, by weight. The molecular weight by gel permeation chromatography of the soluble portion was >30,000 ($\overline{M}_w$, polystyrene calibration).

While the invention has been described in detail and with reference to specific embodiments thereof, it will be apparent to one skilled in the art that various changes and modifications can be made therein without departing from the spirit and scope of the invention.

What is claimed is:

1. A block copolymer comprising a phosphoryl-coupled polyphenylene oxide radical and polyfunctional polystyrene radical.

2. A block copolymer comprising a quinone coupled polyphenoxy radical of the formula:

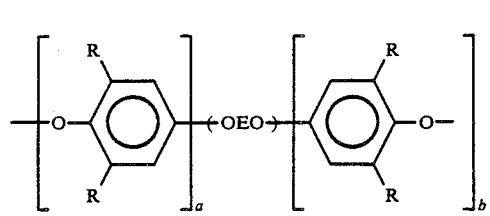

wherein independently each —(OEO)— is a divalent quinone residue, E is a divalent arene radical, either a or b is at least equal to 1, the sum of a plus b is at least equal to 10, and R is a hydrogen, a hydrocarbon radical, a halohydrocarbon radical, a hydrocarbonoxy radical or a halohydrocarbonoxy radical; coupled by a phosphorylradical of the formula:

to a polyfunctional polystyrene radical of the formula:

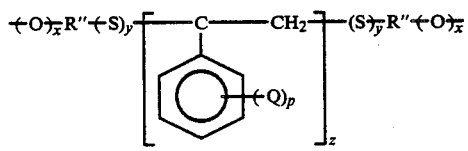

wherein independently each x is an integer at least equal to 1 and is a maximum equal to the number of replaceable hydrogen atoms associated with the R" arene radical, y is an integer at least equal to 1, R" is at least a divalent arene radical, Q is a hydrogen, halogen, alkyl or alkenyl radical, p is an integer of from 1 to 5, and z is an integer at least equal to 2.

3. The claim 2 compound wherein R" is phenylene, and —(OEO)— is of the formula:

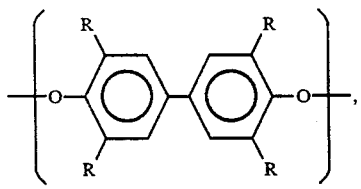

wherein independently each R is as defined hereinbefore.

4. The claim 3 compound, wherein the sum of a plus b is equal to 40 to 170, both x and y are equal to 1, and z is 2 to 1000.

5. The claim 2, 3 or 4 compound wherein each R is hydrogen, hydrocarbon or a halohydrocarbon radical.

6. The claim 4 compound, wherein each R is a methyl radical.

7. A process of forming a phosphoryl-coupled block copolymer comprising contacting a phosphoryl coupling agent, a polyphenylene oxide and a polyfunctional polystyrene.

8. A process of forming a phosphoryl-coupled polymer which comprises contacting a phosphoryl coupling agent, a quinone-coupled polyphenylene oxide having an average hydroxyl group per molecule value greater than zero including 2.0 or less, and a polyfunctional polystyrene selected from the group consisting of a bis(hydroxyarylenethio)polystyrene and a bis(organosiloxyarylenethio)polystyrene.

9. The claim 8 process, wherein the phosphoryl coupling agent is of the formula:

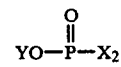

where X is a halogen and Y is phenyl, chlorophenyl, alkyl, arylalkyl, or a halogen and the quinone coupled polyphenylene oxide is of the formula:

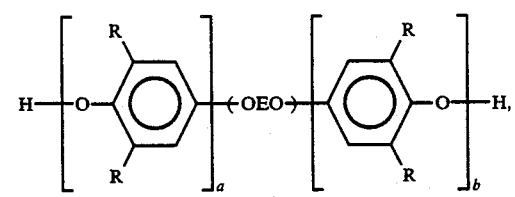

wherein independently each —(OEO)— is a divalent quinone residue, E is a divalent arene radical, either a or b is at least equal to 1, the sum of a plus b is at least equal to 10, and R is hydrogen, a hydrocarbon radical, a halohydrocarbon radical, a hydrocarbonoxy radical or a halohydrocarbonoxy radical, and the polyfunctional polystyrene of the formula:

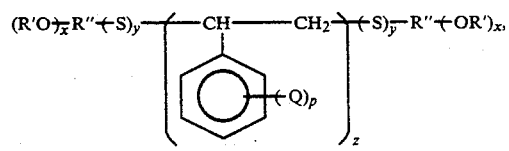

wherein independently each x is an integer at least equal to 1 and is a maximum equal to the number of replaceable hydrogen atoms associated with the R" arene radical, y is an integer at least equal to 1, R' is hydrogen or an organosilyl group, R" is at least a divalent arene radical having at least one (R'O— radical directly bonded to an aromatic ring carbon atom via the oxygen atom, Q is a hydrogen, halogen alkyl or alkenyl radical, p is an integer of from 1 to 5, and z is an integer at least equal to 2.

10. The process of claim 9 wherein the coupling agent is phosphoryl chloride.

11. The claim 9 process, wherein —(OEO)— is of the formula:

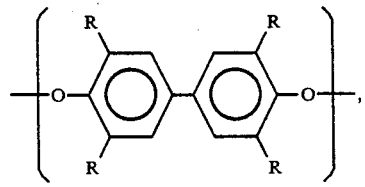

wherein independently each R is as defined hereinbefore, R' is hydrogen and R" is phenylene.

12. The claim 11 process, wherein the sum of a plus b is 40 to 170, both x and y are equal to 1, and z is equal to 2 to 1000.

13. The claim 12 process, wherein each R is hydrogen, a hydrocarbon, or a halohydrocarbon radical.

14. The claim 9, 11, 12 or 13 process, carried out in the presence of water soluble base.

15. The claim 14 process, carried out in the presence of a catalytic phase transfer agent.

* * * * *